(12) United States Patent
Liu

(10) Patent No.: US 7,593,379 B2
(45) Date of Patent: *Sep. 22, 2009

(54) METHOD AND SYSTEM TO PROVIDE SERVICE AVAILABILITY TO MULTI-MODE TERMINALS IN DIFFERENT ACCESS NETWORKS

(75) Inventor: Huitao Liu, Round Rock, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/124,100

(22) Filed: May 20, 2008

(65) Prior Publication Data

US 2008/0220756 A1    Sep. 11, 2008

Related U.S. Application Data

(63) Continuation of application No. 11/011,498, filed on Dec. 14, 2004, now Pat. No. 7,376,112.

(51) Int. Cl.
*H04W 4/00* (2009.01)
(52) U.S. Cl. .................................. 370/338; 455/552.1
(58) Field of Classification Search ................ 370/338; 455/552.1
See application file for complete search history.

(56) References Cited

U.S. PATENT DOCUMENTS 6,381,453 B1 * 4/2002 Krishnan ................. 455/414.1
7,376,112 B2 * 5/2008 Liu ............................ 370/338
2004/0219948 A1 * 11/2004 Jones et al. .............. 455/552.1

FOREIGN PATENT DOCUMENTS

EP          700227 A2 *   3/1996

* cited by examiner

Primary Examiner—Vincent P Harper
Assistant Examiner—Marivelisse Santiago-Cordero
(74) Attorney, Agent, or Firm—Toler Law Group

(57) ABSTRACT

A method and system to provide service availability to multi-mode terminals in different access networks is presented. In an embodiment, a computer-readable medium includes instructions that, when executed by a computer, cause the computer to automatically enable first call forwarding prior to a wireless multi-mode communication terminal access from a first communication network to a second communication network, where first calls are redirected from a first directory number of the first communication network to a second directory number of the second communication network. The computer-readable medium also includes additional instructions that, when executed by the computer, cause the computer to automatically disable second call forwarding subsequent to the wireless multi-mode communication terminal access change when the second call forwarding conflicts with the enabled first call forwarding. The second call forwarding includes redirecting incoming second calls to a first directory number of the first communication network.

20 Claims, 2 Drawing Sheets

METHOD AND SYSTEM TO PROVIDE SERVICE AVAILABILITY TO MULTI-MODE TERMINALS IN DIFFERENT ACCESS NETWORKS

CLAIM OF PRIORITY

The present application claims priority from and is a continuation of patent application Ser. No. 11/011,498 filed on Dec. 14, 2004 and entitled "Method and System for Seamless Service Availability for Multi-Mode Terminals in Different Access Networks," the contents of which are expressly incorporated herein by reference in their entirety.

FIELD OF THE DISCLOSURE

The present disclosure relates to telecommunications, and in particular to methods and systems to provide seamless communications service availability for multi-mode terminals over different access networks.

BACKGROUND

Wireless Local Area Network (WLAN) offers wireless broadband service, including VoIP and other data services, in a small area with limited mobility. WLAN, especially in terms of Wi-Fi (802.11a/b/g), is been widely deployed in many places. Wireless Wide Area Network (WWAN) offers voice and/or data services over a large geographical area with true mobility. Some device manufacturers are developing or have developed multi-mode terminal devices that are able to work in WLAN and WWAN.

However, the multi-mode devices typically cannot or do not operate in multiple modes (both WLAN and WWAN) simultaneously due to technical difficulties, cost, battery drain, and so forth. For example, if the terminal is working in WLAN mode, then the WWAN circuit may be shut down which makes the terminal unavailable in WWAN.

In addition, typical multi-mode terminal devices have unique directory numbers in different access networks. For example, a terminal may have a directory number in the corporate environment (for example, PBX or PABX) and a directory number in the WWAN network. The problem of ensuring that a call to the terminal's number in an access network reaches the terminal that is currently in a different access network requires a solution.

Current solutions in the industry focus on new functional nodes and signaling protocols in the network to handle the call routing based on the presence of the mobile terminal. This approach requires new network nodes and protocols to be implemented by the network service providers in the current networks, which can be costly, technically difficult, and problematically places the burden of the solution on the service provider.

BRIEF DESCRIPTION OF THE DRAWINGS

The present disclosure is further described in the detailed description that follows, by reference to the noted drawings by way of non-limiting examples of embodiments of the present disclosure, in which like reference numerals represent similar parts throughout several views of the drawings, and in which.

DETAILED DESCRIPTION OF THE DRAWINGS

Figure 1:
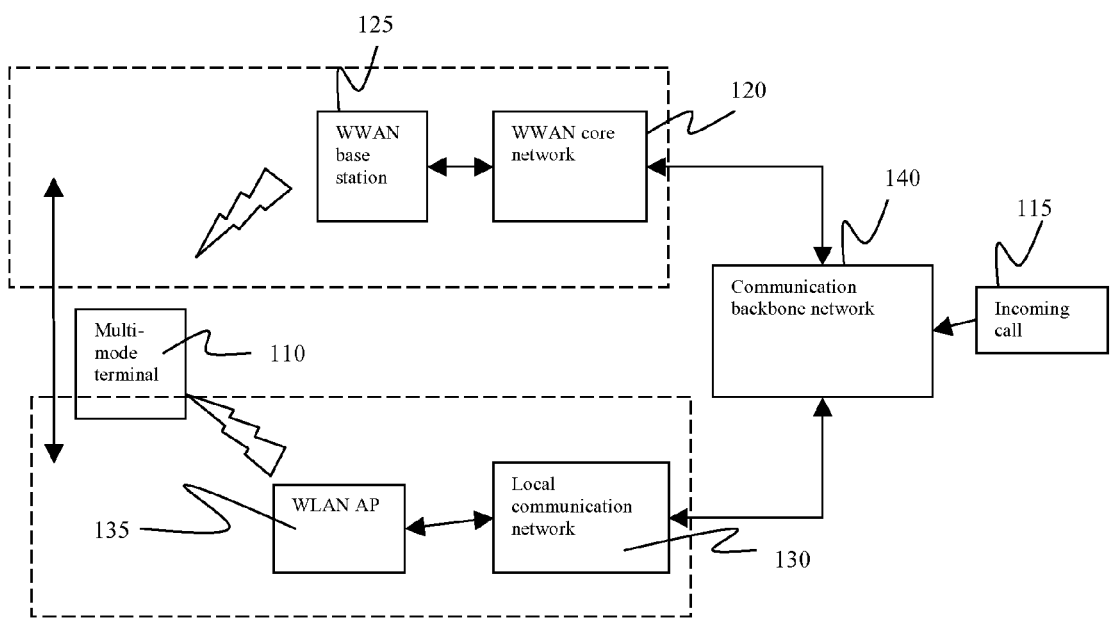
FIG. 1 is a schematic block diagram of a system of an embodiment of the present disclosure.

In view of the foregoing, the present disclosure, through one or more of its various aspects, embodiments and/or specific features or sub-components, is thus intended to bring out one or more of the advantages that will be evident from the description. The present disclosure is described with frequent reference to telephones or cell phones. It is understood that a phone is merely an example of a specific embodiment of the present disclosure, which is directed generically to mobile communication terminals, equipment, systems and methods within the scope of the disclosure, together with attendant networks such as Public Switched Telephone Networks (PSTN) and Internet Protocol (IP) telephony, including but not limited to Voice-Over IP (VoIP). The terminology, therefore, is not intended to limit the scope of the disclosure.

Definitions

Wireless Local Area Network (WLAN): a wireless network that offers wireless communication and covers a small geographical area, typically less than 100 meters in diameter. WLAN includes Wi-Fi (802.11a/b/g), HiperLAN (an alternative, European, WLAN standard to the American IEEE 802.11 standards), and the like.

Wireless Wide Area Network (WWAN): a wireless network that offers wireless communication and covers a large geographical area, typically a few miles. WWAN includes 2G and 3G wireless networks (GSM, IS-136, IS-95, UMTS, CDMA1x, etc), WiMax, 802.16, and the like.

Wireless multi-mode device: terminal device that is capable of access and work in both WLAN and WWAN networks.

Intelligent Call Forwarding Module (ICFM): a functional module which can be either a software or hardware implementation that resides in the wireless multi-mode device. When a triggering event happens (for example access network change), the ICFM automatically or manually (by user interaction) enables the call forwarding feature in the previous access network to the directory number in the current access network and disables other call forwarding settings that may conflict with the new call forwarding action. The module also logs the events (access network and call forwarding status) in the device's memory for later use.

Call forwarding (or call diverting), in telephony, is a feature on some telephone networks that allows an incoming call to a called party which would be otherwise unavailable to be redirected to a mobile telephone or other telephone number where the desired called party is situated. Typically, special types of call forwarding can be activated only if the line is busy, or if there is no answer, or even only for calls from selected numbers. In North America, the North American Numbering Plan (NANP) presently uses the following vertical service codes to control call forwarding:

forward all calls: *72 activation; *73 deactivation on busy or no answer;
   activation from select callers: *68, *88, deactivation;
   activation on ISDN: *63, *83, deactivation;
   change forward-to number: *56.

Customer-programmable features are also available through some network providers:
   busy line: *90, activation, *91, deactivation;
   change number: *40;
   no answer: *92, activation; *93, deactivation;
   change number: *42.

The present disclosure includes a combination of algorithms, software and hardware implementation to provide the service availability for multi-mode terminal devices that are capable of communications over Wireless LAN and Wireless WAN. The basic idea is to use a modified call forwarding feature in the networks to forward calls placed to the terminal directory number in other access networks to the directory number in its current serving network.

That is, rather than call forwarding between two different terminals, call forwarding of the present disclosure forwards a call to a selected multi-mode terminal in a first network mode to the same terminal in a second network mode. Forwarding to the same terminal is facilitated by exploiting the distinct assigned terminal phone number for each network environment in which the terminal can operate.

FIG. 1 is a schematic block diagram of a system of one embodiment of the present disclosure. The components of the system include multi-mode terminal 110, which is able to receive incoming call 115 whether terminal 110 is located in WWAN core network 120, with base station 125, or local communication network 130, such as enterprise PBX, with AP 125.

WWAN 120 and local network 120 are linked by communication backbone network 140. Accordingly, incoming call 115 to the WWAN network 120 phone number can be forwarded to terminal 110 in the local network through backbone network 140.

Terminal 110 is able to receive calls regardless of which directory number (of the multi-mode terminal) originating call 115 was targeted. An advantage is that no new network nodes and protocols are needed from the network service provider and the solution only needs to be implemented in the multi-mode terminals.

Figure 2:
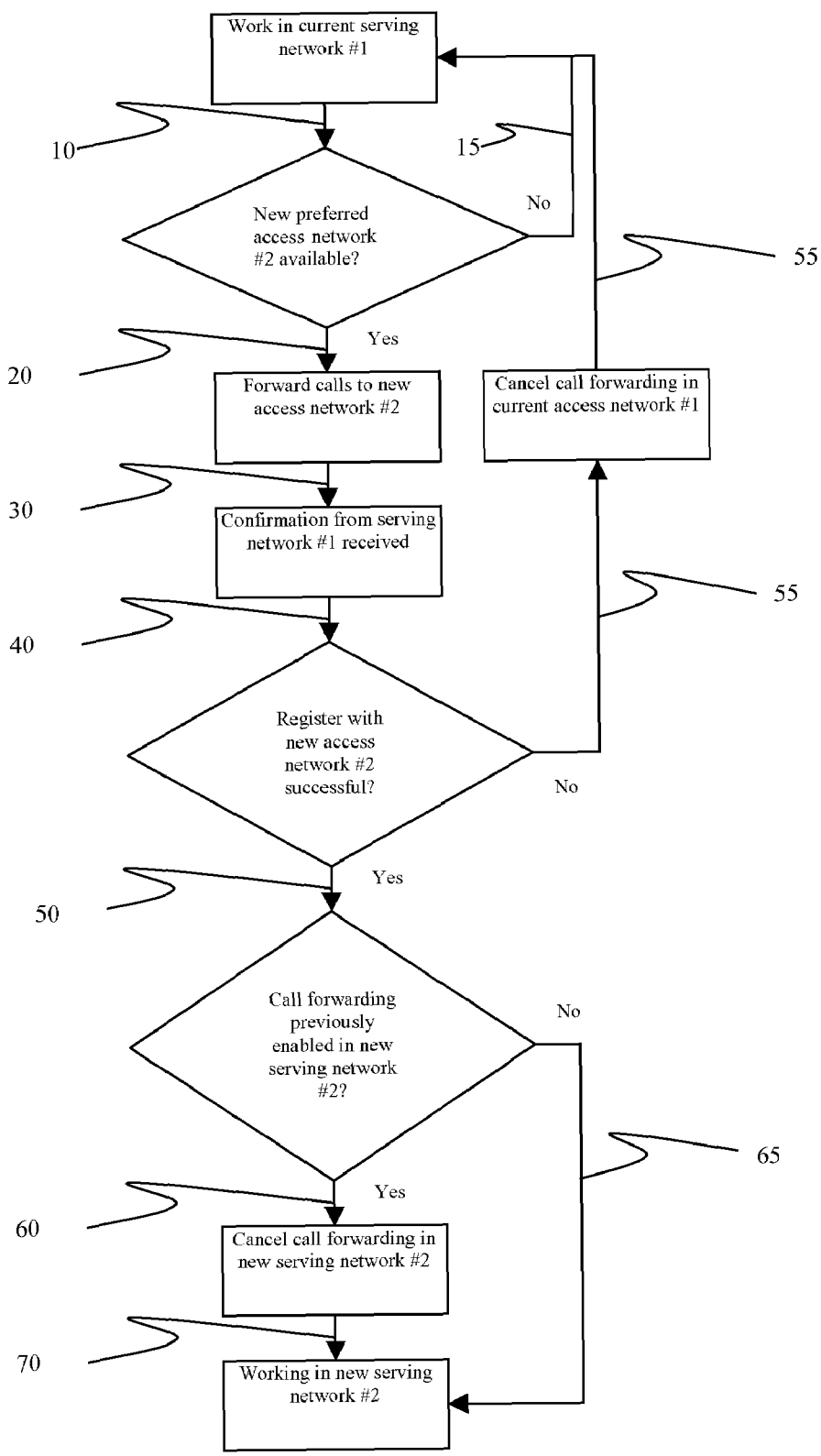
FIG. 2 is a logic flow chart of an embodiment of the present disclosure.

FIG. 2 is a logic flow chart of one embodiment. Multi-mode terminal 110 working in a first network (#1) 10 determines that a new preferred access network #2 is available (WLAN or WWAN, for example) 20, the Intelligent Call Forwarding Module instructs the multi-mode terminal 110 to first send out signaling message in the current serving network #1 to forward all incoming calls to the directory number of multi-mode terminal 110 in the new access network (#2) 30. Otherwise, terminal 110 continues to operate in network (#1) 15.

The module then logs that the call forwarding is enabled in network #1. The information is stored in its internal log. Upon the confirmation 40 from the current network #1, the intelligent call forwarding module, multi-mode terminal 110 registers 50 in the new wireless access network #2. If registration is not successful, terminal 110 cancels 55 call forwarding in network #1.

After the successful registration in the new wireless network #2, the Intelligent Call Forwarding Module checks its internal log to see if call forwarding has been previously enabled in the new serving network (#2) 60. If so, the Module instructs the multi-mode terminal to send out a signaling message to disable call forwarding settings in the new serving network (#2) 70.

If the registration with the new wireless network #2 is not successful, the Module instructs the multi-mode terminal to cancel the call forwarding it had just enabled in the serving network #1 and the multi-mode terminal continues to work in current mode 65.

For example: Assume multi-mode terminal 110 is GSM and WiFi ready. The terminal has one number X in GSM network and one number Y in the corporate PBX or PABX (with WiFi as access network) at the office.

The multi-mode terminal with number X is registered in the GSM network. The multi-mode terminal has network detection hardware and software, and discovers that a preferred WiFi (802.11a/b/g) network connected to a corporate PABX, which supports the service (e.g., voice or data) offered in WWAN, is available.

The multi-mode terminal enables call forwarding in GSM network to forward calls to the number Y. In a specific embodiment, forwarding is enabled by a supplementary services command (e.g., **21*Y#) or other signaling commands supported by the network. When the Home Location Register (HLR) in the GSM network receives the command, the GSM core network forwards incoming calls with destination X to number Y through the communication backbone network. After the call forwarding is enabled, the multi-mode terminal registers with the PBX via the WiFi access network.

The multi-mode terminal queries the PBX or checks its internal memory to discover any previous call forwarding set up (to number X in the GSM network, for example). The terminal disables the call forwarding in the PBX by sending commands (that are supported by the PBX for call forwarding) over the WiFi access network. The terminal now receives calls dialed to number Y. Calls that are dialed to number X will be forwarded to number Y. Therefore, from the calling party's view, the multi-mode terminal is also available as number X.

When the terminal leaves the WiFi network (corporate PBX), the ICFM performs the call forwarding procedure again so that it is now available as number X and calls to the PBX number Y are forwarded to number X.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in all its aspects. Although the disclosure has been described with reference to particular means, materials and embodiments, the disclosure is not intended to be limited to the particulars disclosed; rather, the disclosure extends to all functionally equivalent technologies, structures, methods and uses such as are within the scope of the appended claims.

What is claimed is:

1. A computer-readable storage medium including instructions that, when executed by a computer, cause the computer to:
   automatically enable first call forwarding prior to a wireless multi-mode communication terminal access change from a first communication network to a second communication network, wherein the first call forwarding comprises redirecting incoming first calls to a second directory number of the second communication network; and
   automatically disable second call forwarding subsequent to the wireless multi-mode communication terminal access change when the second call forwarding conflicts with the enabled first call forwarding, wherein the second call forwarding comprises redirecting incoming second calls to a first directory number of the first communication network.

2. The computer-readable storage medium of claim 1, wherein the first communication network comprises a wireless wide area network.

3. The computer-readable storage medium of claim 1, wherein the second communication network comprises a wireless local area network.

4. The computer-readable storage medium of claim 1, the first communication network or the second communication network comprises a private branch exchange.

5. The computer-readable storage medium of claim 1, wherein the first communication network and the second communication network are linked by a backbone network.

6. The computer-readable storage medium of claim 1, wherein the first communication network comprises a wireless local area network.

7. The computer-readable storage medium of claim 1, wherein the second communication network comprises a wireless wide area network.

8. The computer-readable storage medium of claim 1, further including instructions to change access from the first communication network to the second communication network.

9. A computer-readable storage medium including instructions that, when executed by a computer, cause the computer to:
provide a wireless multi-mode communication terminal access to a first communication network via a first directory number;
detect availability to the wireless multi-mode communication terminal of a second communication network via a second directory number;
enable first call forwarding of first calls received at the first directory number and forwarded to the second directory number prior to executing an access change of the wireless multi-mode communication terminal from the first communication network to the second communication network;
execute the access change of the wireless multi-mode communication terminal; and
disable second call forwarding of second calls received at the second directory number and forwarded to the first directory number when the second call forwarding conflicts with the enabled first call forwarding after the access change is executed.

10. The computer-readable storage medium of claim 9, further including instructions that, when executed by the computer, cause the computer to register the wireless multi-mode communication terminal with the second communication network.

11. The computer-readable storage medium of claim 10, further including instructions that, when executed by the computer, cause the computer to cancel first call forwarding when registration of the wireless multi-mode communication terminal with the second communication network is unsuccessful.

12. The computer-readable storage medium of claim 9, further including instructions that, when executed by the computer, cause the computer to cancel second call forwarding in the second communication network.

13. The computer-readable storage medium of claim 9, wherein the wireless multi-mode communication terminal comprises a cell phone.

14. The computer-readable storage medium of claim 9, wherein the wireless multi-mode communication terminal comprises an intelligent call forwarding module.

15. A method of providing access to a multi-mode communication terminal, the method comprising:
automatically enabling call forwarding of calls directed to a first directory number of a first communication network to a second directory number of a second communication network before a change of access from the first communication network to the second communication network;
changing access of the multi-mode communication terminal from the first communication network to the second communication network; and
automatically disabling call forwarding of calls directed to the second directory number of the second communication network conflicting with the enabled call forwarding of calls directed to the first directory number of the first communication network after the change of access from the first communication network to the second communication network.

16. The method of claim 15, wherein changing access comprises registering the multi-mode communication terminal with the second communication network.

17. The method of claim 15, further comprising determining whether call forwarding was previously enabled to the second directory number of the second communication network from the first directory number of the first communication network.

18. The method of claim 15, wherein the first communication network or the second communication network comprises a wireless local area network.

19. The method of claim 15, wherein the first communication network or the second communication network comprises a global system of mobile communication.

20. The method of claim 15, wherein the multi-mode communication terminal comprises a cellular phone.

* * * * *